United States Patent [19]

Francis

[11] Patent Number: 4,518,643
[45] Date of Patent: May 21, 1985

[54] PLASTIC FILM

[75] Inventor: Michael A. Francis, Mechanicsville, Va.

[73] Assignee: Ethyl Corporation, Richmond, Va.

[21] Appl. No.: 516,657

[22] Filed: Jul. 25, 1983

[51] Int. Cl.$^3$ ............................ B32B 1/00; B32B 3/30
[52] U.S. Cl. .................................. 428/131; 428/156; 428/179; 428/180; 428/332
[58] Field of Search ............... 428/174, 179, 180, 156; 264/284, 293

[56] References Cited

U.S. PATENT DOCUMENTS

| | | | |
|---|---|---|---|
| Re. 23,910 | 12/1954 | Smith et al. ........................ | 18/19 |
| 1,914,801 | 6/1933 | Chadwick ........................ | 156/440 |
| 2,851,389 | 9/1958 | Lappala ........................ | 154/46 |
| 3,054,148 | 9/1962 | Zimmerli ........................ | 18/56 |
| 3,137,746 | 6/1964 | Seymour et al. ........................ | 264/73 |
| 3,156,027 | 11/1964 | Wellman ........................ | 28/1 |
| 3,176,058 | 3/1965 | Mittman ........................ | 264/284 |
| 3,214,320 | 10/1965 | Lappala et al. ........................ | 428/134 |
| 3,222,237 | 12/1965 | McKelvy ........................ | 156/177 |
| 3,231,454 | 1/1966 | Williams ........................ | 428/174 |
| 3,246,365 | 4/1966 | Kloender ........................ | 425/367 |
| 3,272,679 | 9/1966 | Hebberling ........................ | 156/440 |
| 3,374,303 | 3/1968 | Metz, Jr. ........................ | 264/216 |
| 3,484,835 | 12/1969 | Trounstine et al. ........................ | 428/179 |
| 3,687,764 | 8/1972 | Rogosch et al. ........................ | 156/179 |
| 3,760,940 | 9/1973 | Bustin ........................ | 206/58 |
| 3,911,187 | 10/1975 | Raley ........................ | 428/180 |
| 3,950,480 | 4/1976 | Adams et al. ........................ | 264/284 |
| 4,155,693 | 5/1979 | Raley ........................ | 425/363 |
| 4,157,237 | 6/1979 | Raley ........................ | 425/363 |
| 4,252,516 | 2/1981 | Raley et al. ........................ | 425/290 |
| 4,317,792 | 3/1982 | Raley et al. ........................ | 264/504 |
| 4,343,848 | 8/1982 | Leonard ........................ | 428/174 |
| 4,376,147 | 3/1983 | Byrne et al. ........................ | 428/156 |

Primary Examiner—Paul J. Thibodeau
Attorney, Agent, or Firm—Donald L. Johnson; John F. Sieberth; Paul H. Leonard

[57] ABSTRACT

A thermoplastic film having a permanently embossed design or geometric shape built therein for controlling the coefficient of friction of sheets of the film when placed adjacent each other. The film has a relatively smooth or female surface on one side and a relatively rough or male surface on the other side. By varying the relationship of one sheet of film placed adjacent another sheet of film or a surface area of the same film, a desired level of coefficient of friction can be obtained. A relatively low coefficient of friction is obtained when two sheets of the film are placed adjacent each other in a female side to female side relationship. A relatively high coefficient of friction is obtained when two sheets are placed adjacent each other in a male side to male side relationship. The film may be perforated or non-perforated and single layer or multi-layer.

9 Claims, 6 Drawing Figures

PLASTIC FILM

BACKGROUND OF THE INVENTION

The present invention is in the field of plastic films or sheets and more particularly relates to embossed and/or perforated thermoplastic films.

Embossed plastic films are used for a variety of purposes as a substitute for textiles, as in raincoats or other wearing apparel, diaper liners, shower curtains, hospital pads and drapes. Such film is also used in the packaging field, for example as bags and overwraps for articles such as clothing, etc., and for shopping bags.

Perforated films also have many useful applications. Films of this type are used in gardening and farming to prevent the growth of grass or weeds while permitting moisture to be transmitted through the film to the solid beneath. Perforated thermoplastic film is also used for making disposable diapers and in packaging of foods and other materials.

One generally common embossed film pattern is one which consists of a pattern of protruding bosses in the plastic film which extend up from only one surface of the film surface. These bosses are formed in the film such that the sides of the designs form channels which may extend diagonally or perpendicularly to the edges of the sheet.

An embossed thermoplastic film characterized in that one surface of the film is provided with a plurality of rows of protuberances which have the shape of pyramids with square bases which extend perpendicular to both the longitudinal and the transverse axes of the film is shown in U.S. Pat. No. 4,343,848. The protuberances are joined at the edges of the bases by flat valley portions which intersect each other at right angles. The embossed film has a low coefficient of friction and increased embossed thickness.

An embossed film having latitudinally and longitudinally alternating hollow protuberances and depressions on both sides of the film is disclosed in U.S. Pat. No. 3,911,187.

Embossed film having a truncated pyramid pattern wherein the valleys separating the pyramids are continuous over the full length and width of the film is shown in U.S. Pat. No. 3,760,940. Examples of embossed film having a pattern of rounded top, rectangular base protuberances wherein the valleys extend perpendicular to the transverse and longitudinal axes of the film is shown in U.S. Pat. No. 3,484,835. Square pattern film produced by embossing on a traveling wire wherein the valleys extend parallel to the longitudinal and transverse axes of the film is shown in U.S. Pat. No. Re. 23,910. U.S. Pat. No. 3,137,746 discloses a film having a hexagonal, raised pattern on one surface thereof which is substantially oriented and slit between the embossments to produce a porous film. The hexagons are initially arranged so that continuous valleys exist on two opposite sides of the individual rows of protuberances. Embossing patterns as shown in these patents produce embossed films which have a high coefficient of friction. In some applications such as baby diapers, it is desirable that the coefficient of friction be kept low.

Embossed thermoplastic films such as polyethylene, polypropylene, polybutene-1, polyvinyl chloride, and other flexible thermoplastics normally extruded into film have been made by various methods. One method used to prepare embossed thermoplastic film is to extrude the thermoplastic material, e.g., polyethylene, from a conventional slot extrusion die onto a continuously moving, smooth, cooled casting surface, e.g., a chill roll. The engraved pattern may be applied to the chill roll and the film pressed to the roll while in the amorphous or molten stage by press rolls. Alternatively, the chill roll may be very smooth and the desired pattern in the film may be impressed into the film on the chill roll by means of an engraved or machined embossing roll which is pressed against the film and the chill roll to impress the pattern into the film as it is cooled on the chill roll. The softness of embossed film produced by chill casting is directly related to the density of the polyethylene resin used. In order to obtain different degrees of softness or stiffness, it is necessary to use a number of polyethylene resins having different densities. Thus, if it is desired to produce a relatively stiff embossed film, it is necessary to use more expensive polymers having high densities as the feed material to the slot die.

Embossed film rolls of poor conformation produce problems when running the film through fabricating machines or through a film printing apparatus.

An example of a method and apparatus for producing film according to the foregoing slot die-chill cast roll technique is shown in U.S. Pat. No. 3,374,303.

Another technique used for embossing plastic film has been the utilization of a heated engraved embossing roll in conjunction with a backup roll. The preformed strip of thermoplastic film normally at room temperature, is passed between the nip of a heated engraved roll and a backup roll and is embossed by being heated while in contact with the heated, engraved roller. The resultant embossed film usually has a very shallow and poorly defined pattern. An example of an apparatus and process for carrying out embossing of this type is shown in U.S. Pat. No. 3,176,058.

A third process for embossing thermoplastic film has been to pass the film over a heated roll or a series of heated rollers in order to heat the film to a softened state and then to contact the film with an embossing roller and to press the film against the embossing roller by a backup roller. Normally, the embossing roller and the backup rollers are cooled in order to freeze the embossed pattern into the film so that it may be immediately wound up into rolls, if desired. An apparatus and process for preparing an embossed film according to the foregoing is shown in U.S. Pat. No. 3,246,365.

A more recent process for embossing plastic material is shown in U.S. Pat. No. 3,950,480, wherein the film is heated by a nondirect contact heat source to raise the temperature of the film above its softening point and the film is then immediately fed between adjacent, counter-rotating embossing rollers, and thereby embossed.

One of the methods for perforating thermoplastic sheet or film is disclosed in U.S. Pat. No. 3,054,148, issued to Zimmerli, which is hereby incorporated by reference. The Zimmerli patent discloses a stationary drum having a molding element mounted around the outer surface of the drum which is adapted to rotate freely thereon. A vacuum chamber is employed beneath the screen or molding element to create a pressure differential between the respective surfaces of the thermoplastic sheet to cause the plasticized sheet to flow into the perforations provided in the molding element and thereby cause a series of holes to be formed in the sheet.

U.S. Pat. Nos. 4,155,693 and 4,157,237 illustrate types of screens or molding elements.

U.S. Pat. Nos. 4,252,516 and 4,317,792 disclose apparatus and method, respectively for manufacturing thermoplastic sheet having elliptical holes.

Sheets of flexible, reinforced laminated plastic material are finding increasing use in a wide variety of applications today. The advent of low cost thermoplastic material, e.g., polyethylene has increased the use of reinforced polyethylene as a covering for greenhouses, barns, temporary buildings, weatherproofing large buildings under construction, and as a covering material for materials stored in the open, e.g., lumber, grain, hay, and many other uses. Most reinforced thermoplastic sheet material is manufactured by laminating a web of strand material between two sheets of thermoplastic. Reinforced film is commonly made by heat bonding thermoplastic film through the openings provided in the web of reinforcing material, by applying adhesive to the web or to one or more of the innerfaces of the thermoplastic material and pressing the plastic material to either side of the reinforcing material, and by extruding one or more layers of thermoplastic material onto a reinforcing material to provide a unitary reinforced thermoplastic sheet. Among patents disclosing reinforced thermoplastic material and methods for their manufacture are U.S. Pat. Nos. 2,851,389; 3,214,320; 3,222,237, and 3,687,764.

The reinforcing material may be in the form of a prewoven scrim or woven mesh material having wide openings between the strands. The strands from which the web is prepared may be from either monofilament or multifilament materials. In some cases it is preferred to lay a uniformly arranged array of strands of reinforcing material into a web on one of the plastic sheets immediately prior to applying adhesive thereto or fusing the sheets together by heat. Machines for laying down a nonwoven scrim to provide reinforcement between sheets of plastic material are shown in U.S. Pat. Nos. 3,272,679; 3,156,027; and 1,914,801.

It is therefore a principal object of the present invention to provide a plastic film with geometric shapes built therein for controlling the coefficient of friction of the film.

It is an important object of the invention to provide a plastic film having geometric shapes constructed therein for controlling the coefficient of friction of the film which may be either perforated or non-perforated.

It is a particular object of the present invention to provide a plastic film with geometric shapes so constructed therein, that one surface area of the plastic film may be adjoined or fixed to another surface thereof by the mere application of pressure.

Other objects and advantages of the invention will be more readily apparent from the description and drawings herein- after.

SUMMARY OF THE INVENTION

The present invention relates to an embossed and/or perforated thermoplastic film which has predetermined geometric shapes built therein for controlling the coefficient of friction of sheets of the film when placed or positioned adjacent each other. The film has a relatively rough or male side and a relative smooth or female side. Each surface of the film is so constructed that when two male sides of the film are placed adjacent each other a relatively high coefficient of friction is obtained, and when two female sides of the film are placed adjacent each other a relatively low coefficient of friction is obtained.

BRIEF DESCRIPTION OF THE INVENTION

DESCRIPTION OF THE PREFERRED EMBODIMENTS

Figure 1:
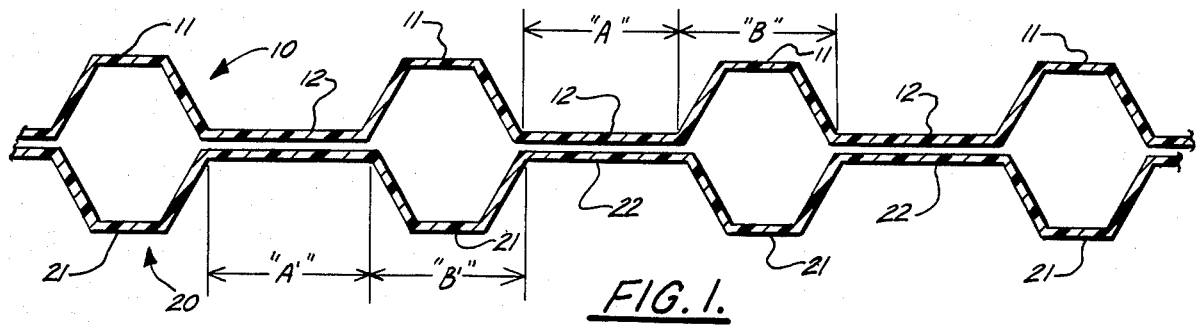
FIG. 1 is a sectional view of two sheets of embossed thermoplastic film of this invention adjacent each other in a female side to female side relationship.

Referring now to the drawings and particularly to FIG. 1, a section of embossed film 10 of the present invention is illustrated in a female side to female side relationship to another section of similar film 20. The film 10 comprises a series of truncated cones 11 arranged in parallel rows with a section of film 12 between each truncated cone 11. The protuberances 11 may also be truncated pyramids or other truncated geometrical shapes, but a truncated cone is preferable. The cones 11 are so positioned on the film 10 that the distance "A" is greater than the distance indicated at "B". The portion of the film 20 is substantially identically to that of the portion of the film 10 and has protuberances 21 and sections 22 between such protuberances. As in the section of film 11, the section between the truncated cones 21 of the section of film 20 has a length indicated by "A'". The truncated cones 21 have a length from base to base indicated at "B'". The distance "A'" is greater than the distance "B'".

As readily seen in FIG. 1, the section of film 10 has no protuberances extending into the section of film 20 and the two sections of film can be moved adjacent each other with relative ease, thereby providing an arrangement between adjacent film surfaces having a relatively low coefficient of friction (COF).

Figure 2:
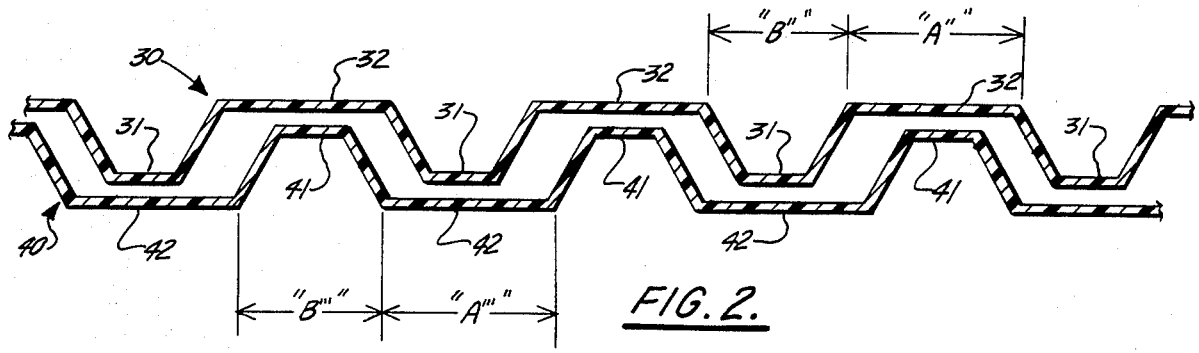
FIG. 2 is a sectional view of two sheets of embossed thermoplastic film of this invention adjacent each other in a male side to male side relationship.

In FIG. 2, a section of film 30 is placed in a male to male relationship adjacent a section of film 40. The film 30 and the film 40 are constructed substantially the same as that of the film 10 and the film 20. Only the relationship between the protuberances is changed. The film 30 has protuberances or truncated cones 31 which are separated by a section 32. The length of the section 32 is indicated at "A''" and the length of the truncated cone from base to base is indicated at "B''". Film section 40 has a plurality of truncated cones 41 separted by sections or longitudinal members 42. The length of a longitudinal member 42 is indicated at "A'''" and the length of a truncated cone from base to base is indicated at "B'''". The distance "A'''" is greater than the distance "B'''".

In the male to male film relationship of FIG. 2, the truncated cones 31 of the film section 30 are placed adjacent the longitudinal members 42 of the film section 40. Such relationship in effect locks the section of film 30 with the section of film 40 and provides a film to film relationship having a relatively high coefficient of friction.

Figure 3:
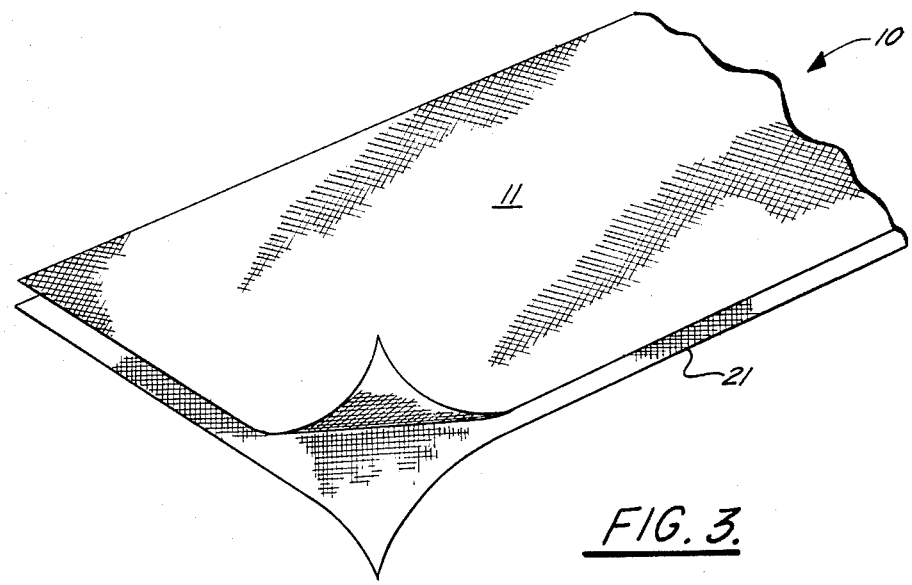
FIG. 3 is a perspective view of two sheets of thermoplastic film positioned adjacent each other.

FIG. 3 illustrates the relationship of the section of film 11 adjacent a section of film 21.

Figure 4:
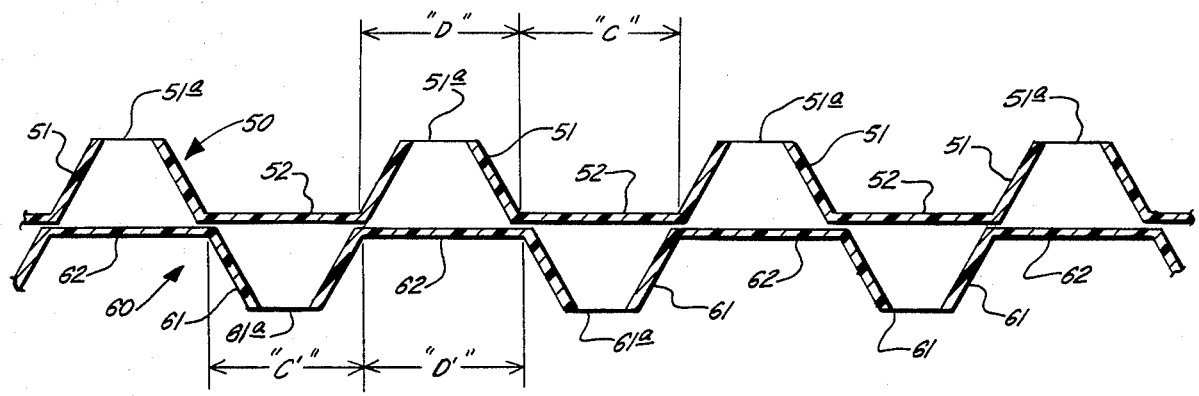
FIG. 4 is a sectional view of two sheets of perforated plastic film of this invention adjacent each other in a female side to female side relationship.
Figure 5:
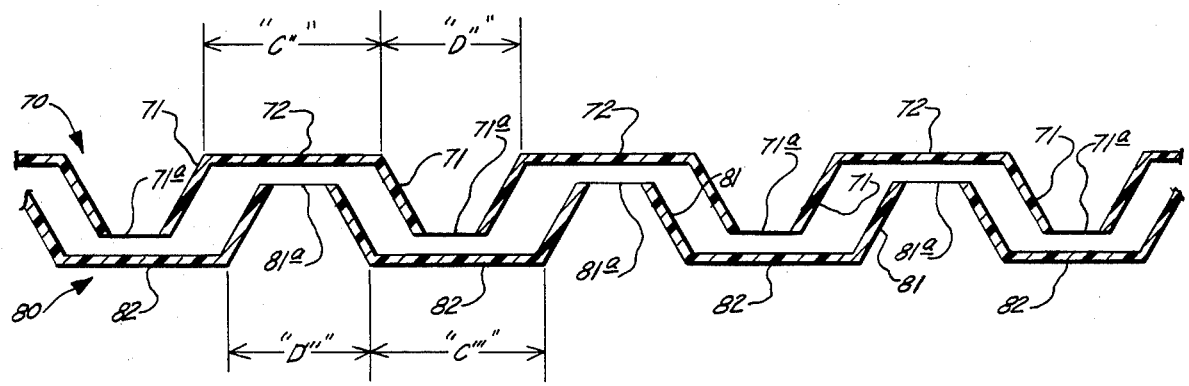
FIG. 5 is a sectional view of two sheets of perforated plastic film of this invention adjacent each other in a male side to male side relationship.

FIGS. 4 and 5 are similar to FIGS. 1 and 2, respectively, except that the film shown therein is also perforated. A section of perforated film 50 is placed adjacent a section of film 60 in a female side to female side relationship. The film section 50 has a plurality of truncated cones 51 separated by a plurality of longitudinal members or sections 52. Each of the truncated cones 51 has an opening 51a therein. The distance indicated at "C" is greater than the distance indicated at "D". The film 60 is substantially identical to that of the film 50 and has a plurality of truncated cones 61 with perforations or openings 61a therein which truncated cones are separated by longitudinal members or sections 62. The distance "D'" is greater than the distance indicated "C'".

In FIG. 5, a section of perforated film is indicated at 70 in a male to male relationship with a section of film indicated at 80. The section of film 70 has a plurality of truncated cones 71, having openings or perforations 71a therein, with each of the cones separated from each other by a longitudinal member or section 72. The distance indicated at "C''" is greater than the distance indicated at "D''". The section of film 80 is substantially identical to the section of film 70 and has a plurality of truncated cones 81, each having an opening 81a therein with the cones being separated by a section or member 82. The distance indicated at "C'''" is greater than the distance indicated at "D'''". The truncated cones 71 of the film 70 are substantially adjacent the longitudinal members 82 of the film 80 and the truncated cones 81 of the film 80 are substantially adjacent the members 72 of the film 70 so that the two sections of film are substantially locked together, providing an arrangement having a high coefficient of friction.

Figure 6:
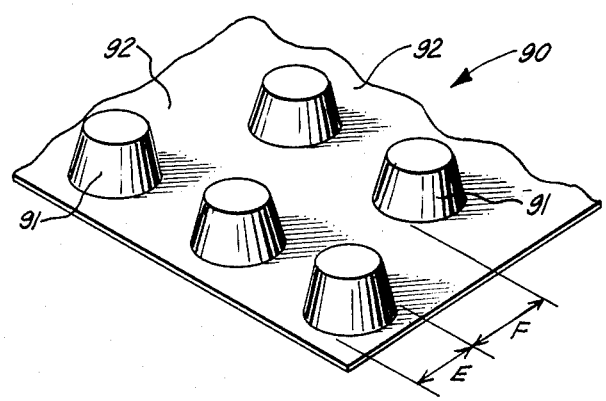
FIG. 6 is a perspective view of a sheet of perforated film of this invention illustrating one type of geometric shape.

Referring to FIG. 6, a sheet of film 90 is illustrated wherein the protuberances are in the form of truncated cones 91 separated by members 92. The distance "F" between the cones is greater than the distance "E" defining the base of the cones. As can be readily seen, the protuberances are located or positioned in alternating longitudinally and latitudinally extending rows. Although variations may be made in the size of the protuberances and spaces therebetween, an alternating row arrangment or offset arrangment and the spacings as aforesaid are essential.

Although a truncated cone is the preferred construction or embossment of the protuberances of the film of this invention, other types of arrangements may be made. For example, the truncated cones may be truncated pyramids or other geometric configurations. It is preferred that the geometric configurations have at least some truncation but such is not necessary. It is important that the protuberances readily mesh in the depressions of the film when two adjacent film sections are adjoined to each other. The film sections may be parts of the same sheet of film or they may be separate or individual sheets of film.

The film of this invention can be produced by any conventional embossing and/or perforating method known to those skilled in the art. The particular manner in which the film is embossed or perforated is within the discretion of the film maker. Also, it is not essential that the particular truncated or other geometric configurations chosen be perfectly formed. It is important that the protuberances be appropriately arranged and the distances as set forth hereinbefore followed.

The protuberances are located in a pattern of longitudinally and latitudinally extended alternate rows. Other geometric patterns are suitable. In general, the embossed or perforated film has from about 200 to about 2000 protuberances per square inch. Greater or lesser numbers of protuberances can be constructed as desired. Protuberances up to about 100,000 per square inch are feasible. The widrh of the protuberances at their base may vary from about 0.5 mil to about 25 mils. Again, the width may be increased or decreased as desired or as equipment permits. The protuberances generally have a height of from about 0.5 mil to about 20 mils. A height of from about 10.0 to 20.0 mils is preferred. Greater or lesser heights can be used, depending upon a particular need or requirement.

The perforations in the protuberances may be round, oval, elliptical, slits or any other suitable shape, as required for the particular end use of tne film.

The present invention is particularly suitable for use in diapers, wherein one surface area of a section of the film is joined to another surface area of the same section of film. A simple application of pressure joins the two areas of the film together. Such arrangement eliminates the necessity for adhesives, pins, or other types of closure mechanisms.

The invention is also useful in various packaging arrangements where it is necessary for a bundle of packages or items to be stacked one upon the other. The "meshing" of one film surface with another permits large stacks or bundles to be placed on a pallet and readily moved from one place to another in a conventional manner without the stacks or bundles falling apart.

The foregoing disclosure and description of the invention is illustrative and explanatory thereof and various changes in the illustrated construction may be made within the scope of the appended claims without departing from the spirit of the invention.

What is claimed is:

1. A thermoplastic film having a plurality of permanently embossed protuberances and depressions of predetermined geometric shapes constructed therein for controlling the coefficient of friction of sheets of the film when placed adjacent each other, each of said protuberances having a relatively flat portion therebetween and the width of each protuberance at its base being less than the length of the relatively flat portion of the film between the base of each protuberance, said protuberances being truncated geometric shapes arranged in latitudinally and longitudinally alternating rows, said film having a relatively rough or male side and a relatively smooth or female side whereby when a male surface of film is placed adjacent another male surface of the same film or a male surface of a separate sheet of film, the protuberances on said male surface of film mesh with the relatively flat portions of said another male surface of the same film or said male surface of the separate sheet of film and thereby a relatively high coefficient of friction is obtained and when a female surface of film is placed adjacent another female surface of the same film or a separate sheet of film, a relatively low coefficient of friction is obtained.

2. The thermoplastic film of claim 1, wherein the geometric shape of the protuberances is a truncated cone.

3. The thermoplastic film of claim 1, wherein the protuberances have openings in the top thereof.

4. The thermoplastic film of claim 1, wherein there are about 200 to 2000 of said protuberances per square inch of said film.

5. The thermoplastic film of claim 1, wherein the base width of said protuberances is from about 0.5 mil to about 25 mils.

6. The thermoplastic film of claim 1, wherein said protuberances have a height of from about 0.5 mil to about 20.0 mils.

7. The thermoplastic film of claim 1, wherein said protuberances have a height of from about 10.0 mils to about 20.0 mils.

8. The thermoplastic film of claim 1, wherein the film is a polyolefin film.

9. The thermoplastic film of claim 1, wherein the film is polyethylene film.

* * * * *

UNITED STATES PATENT AND TRADEMARK OFFICE
CERTIFICATE OF CORRECTION

PATENT NO. : 4,518,643
DATED : May 21, 1985
INVENTOR(S) : MICHAEL A. FRANCIS

It is certified that error appears in the above-identified patent and that said Letters Patent is hereby corrected as shown below:

Column 4, line 62, "B''" should read -- B''' --.

Column 6, line 10, "widrh" should read -- width --.

Column 6, line 20, "tne" should read -- the --.

Signed and Sealed this

Third Day of September 1985

[SEAL]

*Attest:*

DONALD J. QUIGG

*Attesting Officer*     Acting Commissioner of Patents and Trademarks - Designate